(12) United States Patent
Angel

(10) Patent No.: US 12,507,691 B2
(45) Date of Patent: Dec. 30, 2025

(54) OXYGEN COOLING SYSTEM FOR LUNG PRESERVATION

(71) Applicant: NEW YORK UNIVERSITY, New York, NY (US)

(72) Inventor: Luis F. Angel, Hartsdale, NY (US)

(73) Assignee: NEW YORK UNIVERSITY, New York, NY (US)

( * ) Notice: Subject to any disclaimer, the term of this patent is extended or adjusted under 35 U.S.C. 154(b) by 958 days.

(21) Appl. No.: 17/626,985

(22) PCT Filed: Jul. 15, 2020

(86) PCT No.: PCT/US2020/042149
§ 371 (c)(1),
(2) Date: Jan. 13, 2022

(87) PCT Pub. No.: WO2021/011663
PCT Pub. Date: Jan. 21, 2021

(65) Prior Publication Data
US 2022/0264873 A1 Aug. 25, 2022

Related U.S. Application Data

(60) Provisional application No. 62/874,191, filed on Jul. 15, 2019.

(51) Int. Cl.
*A01N 1/144* (2025.01)
*A01N 1/12* (2025.01)

(52) U.S. Cl.
CPC ............ *A01N 1/144* (2025.01); *A01N 1/12* (2025.01)

(58) Field of Classification Search
CPC .......... A01N 1/144; A01N 1/12; A01N 1/146; A01N 1/143
See application file for complete search history.

(56) References Cited

U.S. PATENT DOCUMENTS

| | | | |
|---|---|---|---|
| 9,756,849 B2 * | 9/2017 | Hassanein | A01N 1/143 |
| 2003/0131844 A1 * | 7/2003 | Kumar | A61M 16/0081 128/200.24 |
| 2011/0076666 A1 * | 3/2011 | Brassil | A01N 1/143 435/284.1 |
| 2017/0015963 A1 * | 1/2017 | Ott | C12M 25/14 |
| 2017/0258074 A1 * | 9/2017 | Keshavjee | A01N 1/126 |
| 2018/0221619 A1 * | 8/2018 | Zapol | A61M 16/0072 |

* cited by examiner

*Primary Examiner* — John Mcguirk
(74) *Attorney, Agent, or Firm* — Riverside Law LLP (57) ABSTRACT

A system for lung preservation is described. The system includes a cooler at least partially housing a cooling coil, the cooling coil including a proximal end configured to connect to an oxygen source and a distal end configured to connect to endotracheal tubing. The endotracheal tubing is in fluid communication with a conduit extending through the cooling coil. A positive end expiratory pressure valve connected to the endotracheal tubing. A method for preserving a lung and a method for preserving a lung for transportation are also described.

9 Claims, 7 Drawing Sheets

OXYGEN COOLING SYSTEM FOR LUNG PRESERVATION

CROSS-REFERENCE TO RELATED APPLICATIONS

This application is the U.S. national phase application filed under 35 U.S.C. § 371 claiming benefit to International Patent Application No. PCT/US2020/042149, filed on Jul. 15, 2020, which is entitled to priority to U.S. Provisional Application Ser. No. 62/874,191, filed on Jul. 15, 2019, each of which is incorporated by reference herein in its entirety.

BACKGROUND OF THE INVENTION

In the United States, nearly 2,500 patients annually undergo lung transplantation (approximately 4,000 worldwide). In practically all of these cases, lung preservation is done with external cooling of the lungs which requires transplantation of the lungs ideally within 6 hours of procurement, limiting the transport of lungs to local transplant centers.

Current preservation practices of organs for transplantation require external cooling to decrease tissue injury secondary to hypoxia and hypo perfusion. In particular, lung preservation is performed following traditional external ice cooling, however, the lungs present a physical challenge for cooling as they are filled with air after procurement which acts as a temperature isolator. The bronchioles (small airways) are the main target for complications post lung transplantation, and they are specifically affected in transplant recipients who develop chronic lung allograft dysfunction (CLAD), which is the most common and serious complication of lung transplantation, affecting over 50% of the lung transplant recipients by 5 years after transplant. Hypoxic injury to the bronchiole is one of the mechanisms responsible for the development of CLAD. Ischemic injury to the small airways of the lungs during transport is an issue that limits availability to recipients, ultimately raises healthcare costs, and unfortunately can lead to unsuccessful post-operative patient outcomes.

What is needed in the art is a system and method that will increase the amount of time for which lungs can be preserved for while decreasing the airway complications associated with CLAD.

SUMMARY OF THE INVENTION

In one embodiment, a system for lung preservation includes a cooler at least partially housing a cooling coil, the cooling coil comprising a proximal end configured to connect to an oxygen source and a distal end configured to connect to endotracheal tubing; endotracheal tubing in fluid communication with a conduit extending through the cooling coil; and a positive end expiratory pressure valve connected to the endotracheal tubing. In one embodiment, the cooling coil is a copper coil. In one embodiment, the cooler has an interior surface having a circular profile, and a portion of the cooling coil is configured to wrap along the interior surface of the cooler. In one embodiment, the system includes a temperature sensor connected to at least one of the cooling coil and the endotracheal tubing. In one embodiment, the system includes a controller connected to the temperature sensor. In one embodiment, the system includes a display connected to the controller. In one embodiment, the controller is configured to send an alert signal to the display if the temperature reading falls outside of the range between 0 degrees Celsius and 4 degrees Celsius. In one embodiment, at least one of the proximal end of the cooling coil and the distal end of the cooling coil is configured as an open copper conduit. In one embodiment, the system includes an oxygen source configured to provide continuous oxygen flow connected to the proximal end of the cooling coil. In one embodiment, the oxygen source is an oxygen concentrator connected to the cooler. In one embodiment, the system includes a coil spacer having a first and second opening configured to secure and maintain space between adjacent coils.

In one embodiment, a method for preserving a lung includes placing a lung within a cooler housing comprising a cooling coil at least partially disposed within the housing; and supplying a continuous flow of cooled oxygen to airways within the lung via the cooling coil while maintaining a positive end expiratory pressure. In one embodiment, the cooled oxygen is maintained at a temperature between 0 degrees Celsius and 4 degrees Celsius.

In one embodiment, a method for preserving a lung for transportation includes the steps of placing a lung within a cooler housing; supplying a continuous flow of cooled oxygen to airways within the lung while maintaining a positive end expiratory pressure; and transporting the housing while supplying the continuous flow of cooled oxygen to airways within the lung. In one embodiment, the cooled oxygen is maintained at a temperature between 0 degrees Celsius and 4 degrees Celsius.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

It is to be understood that the figures and descriptions of the present invention have been simplified to illustrate elements that are relevant for a more clear comprehension of the present invention, while eliminating, for the purpose of clarity, many other elements found in systems and methods of lung preservation. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a system and method for lung preservation.

Embodiments of the invention are designed to provide both cooled oxygen (e.g. between 0-4 degrees Celsius) directly to the lung airways and external cooling to the surface of the lungs to prolong the time available for transplantation as well as decreasing the ischemic changes to the lungs with an improved cool preservation. Embodiments may include a connection to an standard endotracheal tube and to a positive end expiratory pressure (PEEP) valve that provides a source of cold oxygen to the lungs and a PEEP to avoid atelectasis (lung collapse).

Figure 1:
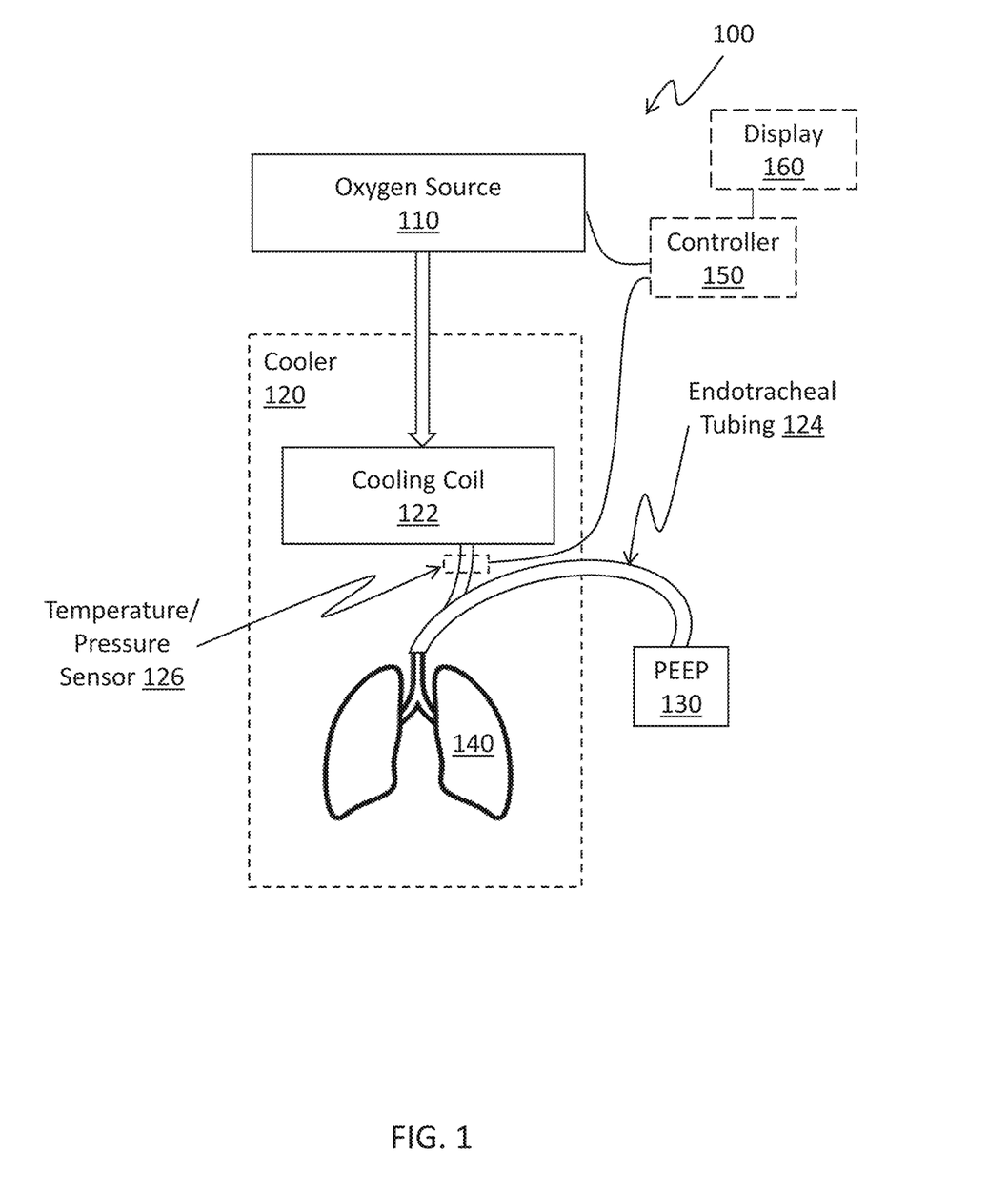
FIG. 1 is a schematic diagram of a system for lung preservation according to one embodiment.

With reference now to FIG. 1, a system 100 for lung preservation is shown in a schematic diagram according to one embodiment. The system 100 includes a cooler 100 at least partially housing a cooling coil 122. The cooling coil (also shown structurally in images of the experimental example of FIGS. 2A and 2B) includes a proximal end that is configured to connect to an oxygen source 110 and a distal end configured to connect to endotracheal tubing 124. The endotracheal tubing 124 is in fluid communication with a conduit extending through the cooling coil 122. A positive end expiratory pressure valve 130 is connected to the endotracheal tubing 124.

In one embodiment, the cooling coil 122 is a hollow copper coil. The copper coil serves as a conduit for transferring oxygenated air from the oxygen supply 110 to the lung 140. Materials such as copper are good heat conductors, and when placed within ice inside the cooler 120 will act as a heat sink to gradually and continuously cool the oxygenated air moving through the cooling coil 122 and into the lung 140.

Figure 2A:
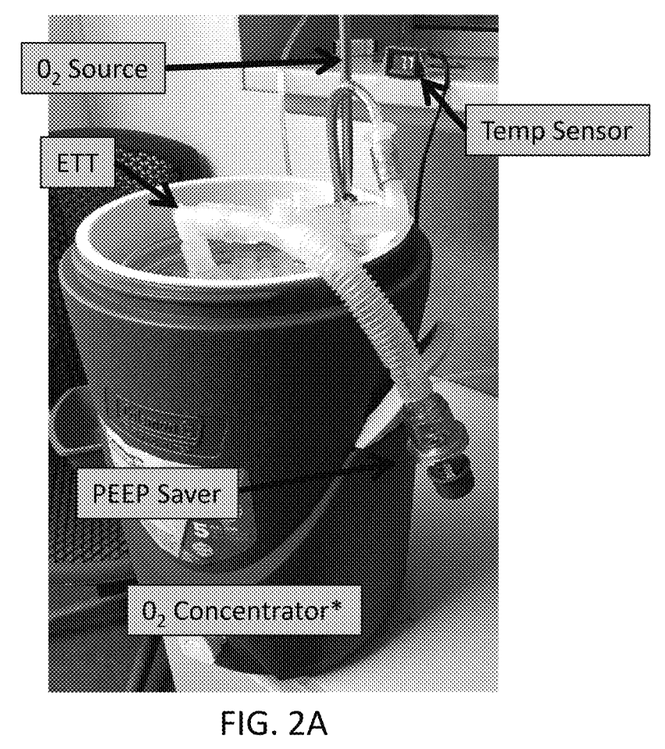
FIG. 2A and FIG. 2B are images of an experimental system for lung preservation according to one embodiment.
Figure 2B:
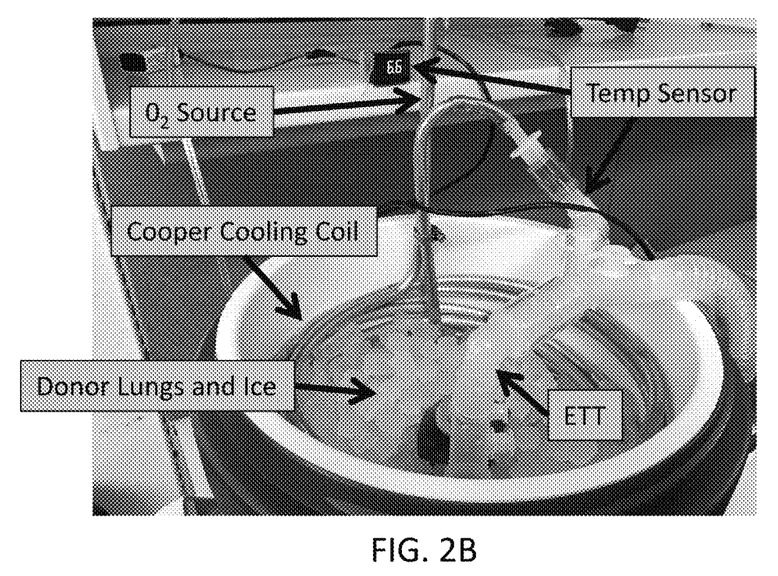

A portion of the cooling coil 122 can be configured to wrap along and rest against the interior surface of the cooler 120 (see e.g. FIGS. 2A and 2B). This configuration will maximize the coil length by using the largest interior diameter of the cooler 120, also allowing sufficient time for oxygenated air to cool as it moves through the cooling coil 122 from the oxygen source 110 the lung 140. This configuration also keeps the cooling coil 122 to exterior portions of the cooler's cavity, maximizing available space for the lung and other system components within the cooler cavity. The proximal and/or distal end of the cooling coil 122 can be left as an open copper conduit for connecting to the oxygen source and endotracheal tubing 124 respectively. Connection mechanisms know in the art can be used (e.g. threaded, friction fit, snap fit, clamp, elastic sleeve, etc.).

In one embodiment, the system includes a temperature sensor connected to at least one of the cooling coil 122 and the endotracheal tubing 124. A controller 150 can be connected to the temperature sensor 126, and a display connected to the controller. The controller can be configured to send an alert signal to the display if the temperature reading falls outside of the range between 0 degrees Celsius and 4 degrees Celsius. The controller 150 can also be connected to a pressure sensor to monitor pressure levels within the lung and endotracheal air circuit. In one embodiment, the pressure range is maintained between 0 and 40 $cmH_2O$. In one embodiment, the pressure range is maintained between 8 and 25 $cmH_2O$. An oxygen source is configured to provide continuous oxygen flow connected to the proximal end of the cooling coil. Feedback from temperature and pressure sensor module 126 can be used to modify the oxygen supply parameters or other components integrated into the system for providing temperature control. In one embodiment, the oxygen source 110 is an oxygen concentrator connected to the cooler 120 so that the entire system is self-contained. Other system feedback can be utilized for modifying system parameters. For example, the target pressure to keep the lungs well inflated can be 12 cm H2O, and once that pressure is obtained, the flow of oxygen can decrease or stop once the ideal pressure and temperature between 0 and 4° C. is obtained. Either a decrease in pressure or an increase in temperature above 4° C. can trigger providing more cooled oxygen to maintain the preset airway pressure and temperature.

Figure 3:
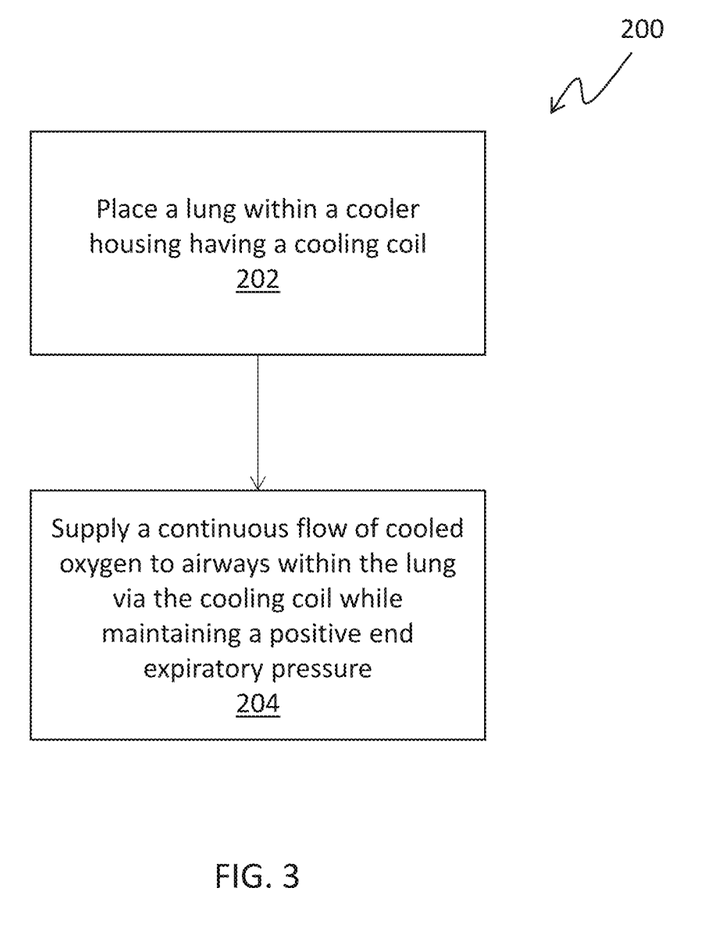
FIG. 3 is a flow chart of a method for preserving a lung according to one embodiment.
Figure 4:
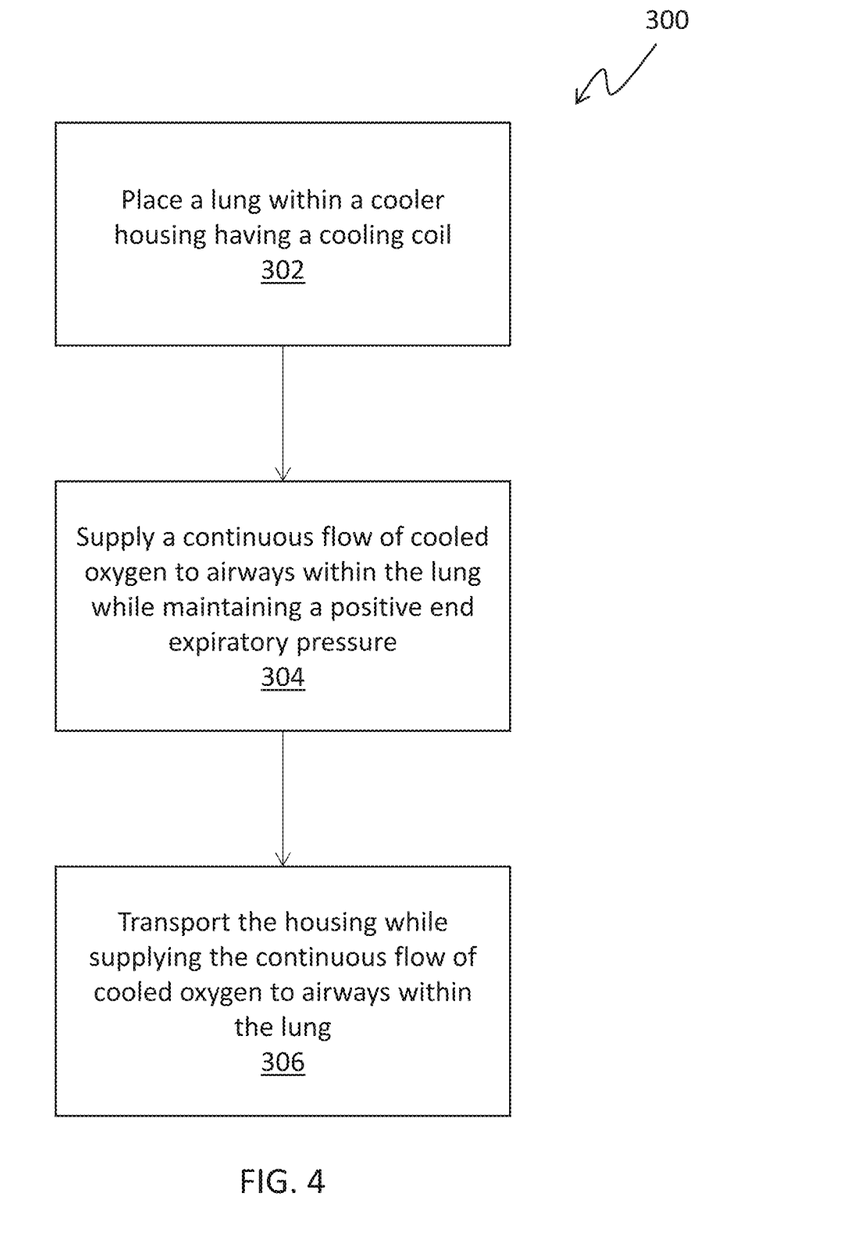
FIG. 4 is a flow chart of a method for preserving a lung for transportation according to one embodiment.

A method 200 for preserving a lung is now described with reference to FIG. 3 according to one embodiment. The method 200 includes the steps of placing a lung within a cooler housing having a cooling coil at least partially disposed within the housing 202, and supplying a continuous flow of cooled oxygen to airways within the lung via the cooling coil while maintaining a positive end expiratory pressure 204. Another method 300 for preserving a lung for transportation is also described with reference to FIG. 4 according to one embodiment. The method 300 includes the steps of placing a lung within a cooler housing 302, supplying a continuous flow of cooled oxygen to airways within the lung while maintaining a positive end expiratory pressure 304, and transporting the housing while supplying the continuous flow of cooled oxygen to airways within the lung 306.

Experimental Examples

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

With further reference now to the experimental example show in the images of FIGS. 2A and 2B, a working prototype was developed to confirm the clinical value in improving the preservation of lungs for transplantation. A commercially available cooler was adapted to allow transportation to the donor hospital and start the dual cold preservation after the lungs are procured from the donor. As an improvement to current standard organ preservation coolers, the system was developed with a copper loop that will cool oxygen to the airways once the cooler is filled with ice after the placement of the lungs in the system. The copper loop is modified to be connected to standard oxygen supplies as well to an endotracheal tube to provide cooled oxygen to the donated lungs and more importantly to the small airways. To improve preservation, continuous oxygen flow is provided with a positive end expiratory pressure (PEEP) valve. Temperature and airway pressure sensors assess the oxygen temperature in the airways to confirm during the entire preservation time that we are obtaining the desired airway temperature (e.g. between 0-4 degrees Celsius) and mean airway pressure to keep the lungs at least partially inflated during transportation.

Figure 5:
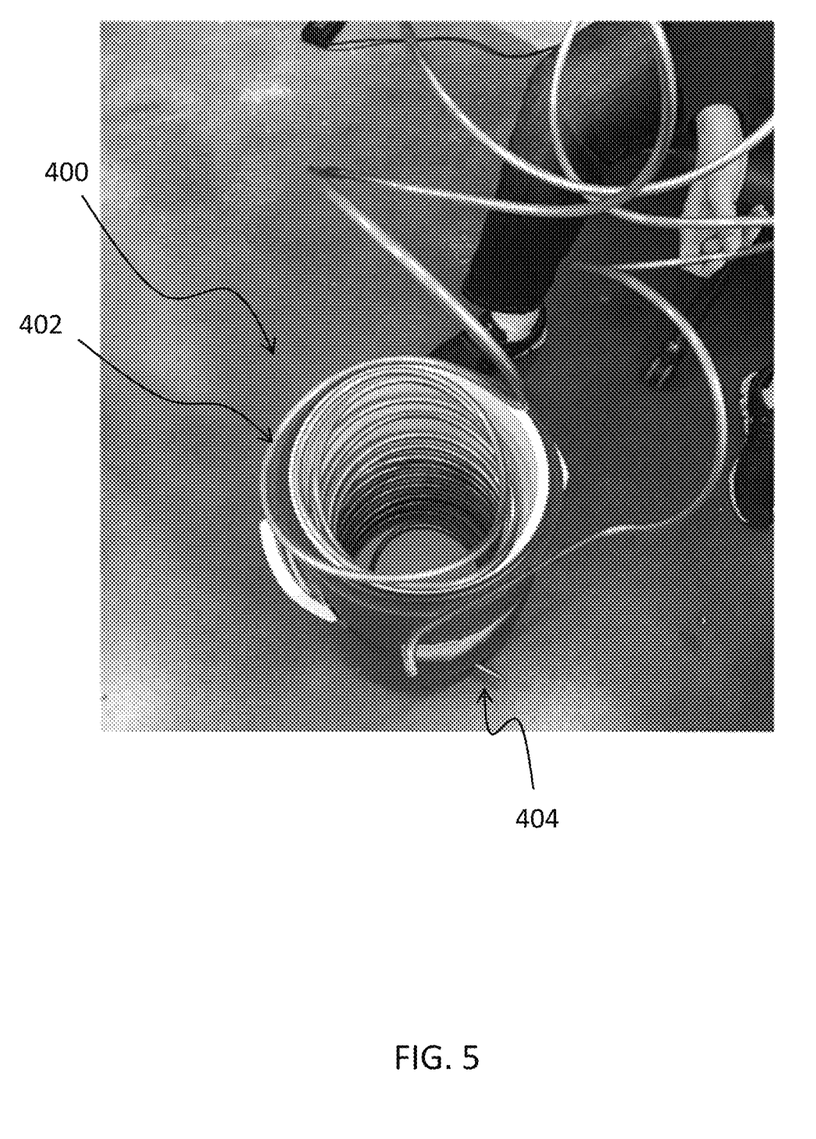
FIG. 5 is an image of a partial experimental system showing coils in a cooler housing according to one embodiment.
Figure 6:
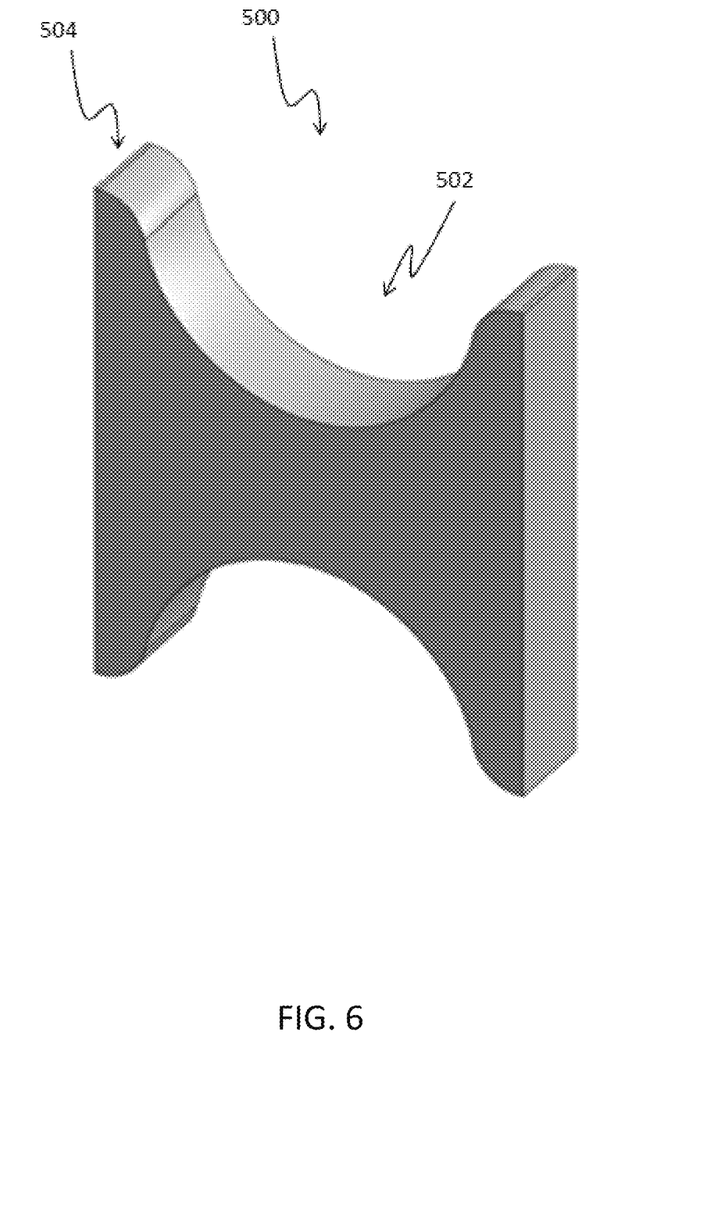
FIG. 6 is a perspective view of a coil spacer according to one embodiment.

With reference now to FIG. 5, in one embodiment, the copper pipe 402 within a prototype cooler 400 was modified in two ways: (1) by rerouting one end of the pipe 402 through the spout at the base of cooler 404, and (2) by reducing the number of coils contained within the cooler 400, which improved coil spacing. These modifications also simplify the lid design and improve heat transfer between the ice and copper coils. Different types of copper piping that include variation in tube dimensions (diameter, wall thickness) and copper ductility (hard vs. soft copper) can be used to achieve the desired flow rates, and for increasing surface area between the pipe and contact with the cooler contents (e.g., ice), allowing for versatile shape formation of the pipe.

With reference now to FIG. 5, according to in one embodiment, a pipe spacer element 500 is used to further control the geometry and structure of the copper pipe along the interior wall of the cooler and facilitates proper coil spacing for desired heat transfer levels. The openings 502 of the spacer 500 can be semi-flexible yet rigid enough to maintain spacing between adjacent pipes, and in one embodiment can include a snap-fit configuration for mating the opening 502 with the coil. Corners 504 of the spacer 500 can be sized accordingly to allow for a predetermined spacing from the interior cooler wall, or for otherwise allowing the pipe to rest flush against the interior cooler wall. In one embodiment, the spacer is configured to space adjacent overlapping coils 0.25 inches apart. In one embodiment, the spacer is configured to space adjacent overlapping coils between 0.20 and 0.30 inches apart. In one embodiment, the spacer is configured to space adjacent overlapping coils 0.25 inches apart. In one embodiment, the spacer is configured to space adjacent overlapping coils between 0.15 and 0.35 inches apart. In one embodiment, the spacer is configured to space adjacent overlapping coils between 0.10 and 0.5 inches apart. In one embodiment, the spacer is configured to space adjacent overlapping coils between 0.05 and 0.5 and 1 inch apart.

In one embodiment, a microcontroller (e.g. an Arduino UNO, which can be the controller 150 of FIG. 1) is used to power the system's electrical circuit, read the temperature sensor and save the data. The microcontroller can be used to read sensors, control actuators, store data and monitor and report data in real-time. To monitor the conditions and evaluate system performance, several sensors in addition to the sensors 126 shown in FIG. 1 can be deployed and connected to the microcontroller. The suite of sensors can be used for example to measure temperature, pressure, humidity, oxygen concentration, and air/$O_2$ flow rates throughout system. The microcontroller can also control the flow of air/$O_2$ through. For example, a small air pump and one-way flow valve can be used to control airflow and regulate pressures through the system. The system can also utilize a display as depicted in FIG. 1 that will have a screen for reporting operational data to the user (e.g., temperatures, pressures, flow rates) as well as controls that allow the user to select operational settings (e.g., total volume, operational limits). The user interface can also have audio and visual alerts if operating limits are exceeded. In one embodiment, an algorithm reads data from the temperature sensor, prints that data, and blinks an LED indicator at a rate based on the temperature reading. This algorithm can serve as the foundation for a program that can read, store, report, and visualize the cooler data.

Figure 7:
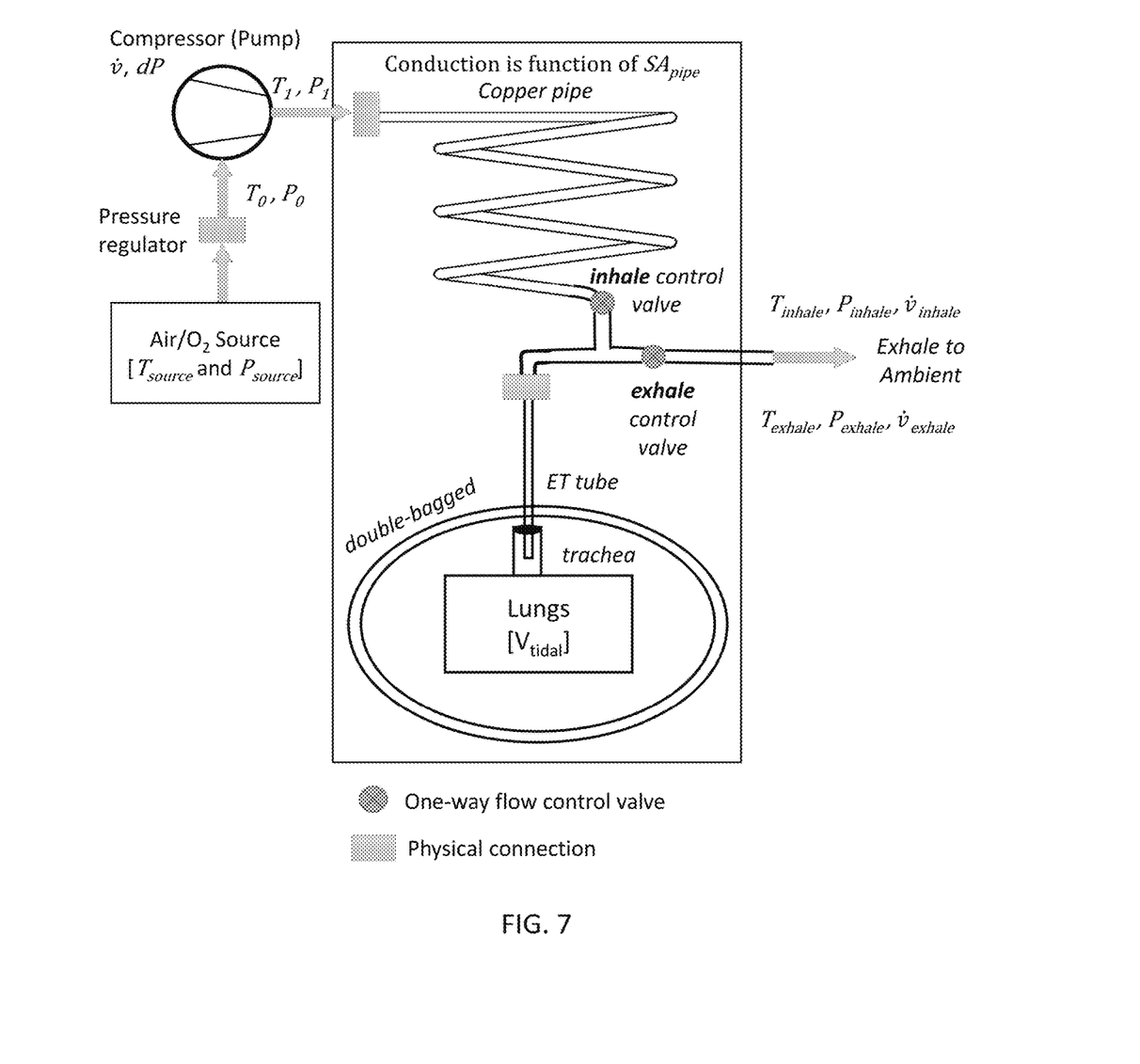
FIG. 7 is a system diagram of a heat and mass transport system according to one embodiment.

With reference now to FIG. 7, a heat and mass transport system diagram according to one embodiment is shown. The system generally has three primary requirements as explained in further detail below.

Primary Requirement 1: Positive Pressure

Based on standards of mechanical ventilation, the cooler system will be required to always maintain a positive pressure in the donor lungs. Positive pressure ensures that the airways stay open with higher pressures serving to keep smaller airways open. Embodiments of the cooler system's positive pressure is analogous to that of a CPAP or PEEP machine which operates with a constant minimum positive pressure typically set between 5-20 cm-$H_2O$. In one embodiment, the maximum pressure that cooler system will induce in the lungs will be no greater than 40 cm-$H_2O$.

Primary Requirement 2: Lung Inlet Temperature

Based on current practices for cold lung preservation during transportation, The cooler system will also operate with $H_2O$ ice which serves to cool the lungs from the outside, similar to current practices, and also cool the air/$O_2$ flowing through the copper pipe. The chilled air/$O_2$ exiting the copper pipe ($T_{inhale}$) in certain embodiments will have a minimum temperature of 0° C. and a maximum temperature of 4° C.

Secondary Requirement: Flow Rate

The flow rate of air/$O_2$ in to and out of the lungs will be primarily set to achieve desired inhale temperature ($T_{inhale}$). A smaller flow rate will produce a lower inhale temperature because the chill time of the air/$O_2$ in the copper pipe increases. Initial testing will range from 1.5-6 liters per minute.

Secondary Requirement: Breaths Per Minute

The cooler system will have the capability to cycle air/$O_2$ into and out of the lungs to ensure that the tidal volume of air remains cool. The breath event will be triggered when the pressure or temperature at the endotracheal tube (ET tube) fall outside of the pre-set operating range.

As shown in the system diagram in FIG. 7, the breath event can occur when the inhale one-way valve is open, and the pump is on. The lungs will "hold a breath" when both the inhale and exhale valves are closed. The exhale event will occur when the exhale one-way valve opens.

Primary Requirement 3: Tidal Volume

Based on standards of mechanical ventilation, it is critical to set a maximum tidal volume for the lungs and to have accurate measurements of the current volume of air in the lungs. The tidal volume is generally calculated using a multiplier for mL/kg of ideal body weight (typ. 500 mL). The tidal volume can be calculated based on the flow rate over time of inhale and exhale events.

Secondary Requirement: Compliance

The microcontroller onboard the cooler system can calculate and report the lung compliance (change in pressure divided by change in volume) in real-time to monitor the health of the lungs over time.

Thus, with further reference to FIG. 7, according to one embodiment, the cooler system can be defined as a fixed volume. The total system can be described by its primary components: Air/$O_2$, the cooler body, ice, copper piping, lungs (synthetic or organic) and flow control (e.g. a pump, solenoid valves and sensors).

System variables can be described by the following units:
T=Temperature [Celsius, ° C.];
P=Pressure [centimeters of water, cm-$H_2O$];
$\dot{v}$=Air/$O_2$ flow rate [cubic centimeters per minute, CCPM]; and
$V_{tidal}$=Lung Tidal Volume [liters, L].

The following operating conditions can be observed:
$P_0$=inlet pressure of air/$O_2$ into the system, after a pressure regulator.
$T_0$=inlet temperature of air/$O_2$ into the system, after a pressure regulator.
$P_1$=pressure of air/$O_2$ in the system, after being pressurized by a pump (i.e., compressor).
$T_1$=temperature of air/$O_2$ in the system, after being pressurized by a pump (i.e., compressor).
$\dot{v}$=air/$O_2$ flow rate through the system
Ideal Gas Law: PV=nRT
$P_0$ and $P_1$ are design selections that inform the choice of pressure regulator and pump
$T_0$ and $T_1$ are consequential from the pressure and dependent on source temperature ($T_{source}$)
$\dot{v}$ is determined by the pump selection (and any subsequent flow control, e.g., orifices and valves) and ventilation control mode The air/$O_2$ now enters the copper pipe and cooling phase. The cooling phase is defined as the duration of when the air/$O_2$ is circulating through the copper piping. The air/$O_2$ is being cooled as it flows through the copper coils which are in direct contact with ice inside the cooler body. Conduction and convection are important, radiation is negligible.

For the sake of quick modeling, the following are assumed:

The pressure and temperature conditions of the air/$O_2$ entering the cooled copper piping are the same as when leaving the compressor (i.e., pump; $P_1$ and $T_1$). (Note assumption could easily change if the connectors between the pump and copper piping have different diameters, orifices, significant direction changes, valves, or other kinds of flow interruptions).

The outer surface of the copper piping is constant at 0° C., because it is in direct contact with the ice. (Note this assumption can be refined in later analysis. Notably, the copper piping will not all have equal exposure to the ice; the surface area between coils may be less well cooled compared to those surfaces facing toward the center of the cooler. Also, if cooler system is not filled completely with ice then there may be a significant buoyancy effect where the upper portion of the cooler is warmer than the cooler).

Now, considering a cross-section of the copper pipe:
$T_x$=temperature of the air/$O_2$, which varies as it flows through the coils of copper piping.
$P_x$=pressure of the air/$O_2$, which changes as it flows through the coils of copper piping.
Primary Design Requirement: $T_x$ drops to 0-4° C. by the time it exits the cooling pipe.
$T_x$ is dependent on many factors, including: starting temperature (T1); pipe dimensions (diameter, wall thickness); and flow rate (time in pipe).

The air/$O_2$ now enters the flow direction control & et tube assembly. This portion of cooler system controls the flow of air/$O_2$ into and out of the lungs via an endotracheal tube (ET tube). The lungs can be in one of three stages: (1) inhaling, (2) holding, or (3) exhaling.

Inhale:
Pump on, one-way intake valve open to allow cool air to flow from the copper pipe into the lungs. The inhale phase can be stopped when (i) a total volume is reached, (ii) a pressure limit is reached, and/or (iii) a time duration for a given flow rate is reached.

Hold:
Close one-way intake valve to hold air/$O_2$ in the ET tube and lungs. Monitor the temperature and pressure of the gases inside the ET tube and lungs assembly.

Exhale:
Open one-way exhale valve to allow air/$O_2$ from lungs to exhaust from the lungs to ambient. The exhale phase can be triggered when (i) pressure drops below a limit, (ii) temperature rises above a limit (probably not time triggered, not sure). Note that data-readout and control will be integrated so that cooler system will operate in a manner similar to a mechanical ventilator to increase familiarity to the medical community.

Regarding Heat Transfer to and from the Lungs:

Donor lungs are generally double-bagged before being placed into a transport cooler. The ambient air trapped in these bags acts as a very good insulator. Direct cooling of the lungs by the ice is significantly hampered. When the cool air/$O_2$ enters the lungs from The cooler system copper pipe heat exchange occurs from the lung tissue to the air/$O_2$, cooling via conduction internally. Maintaining cold internal temperature and positive pressure is intended to significantly improve the preservation of the lungs.

The location of the pump within the system can change. For now, it is assumed to be located outside of the cooler body, and therefore its heat production is ignored. If the pump is integrated into the cooler body in a future prototype, this heat production should be considered. There can be many additional components included (e.g., filters, connectors) which can cause significant pressure changes as flow restrictors. The models can be updated and created in a software suite to compensate for these changes. The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. For example, embodiments of the system may be used in other clinical indications such as patient cooling post cardiac arrest in the intensive care units and for the preservation of organs in situation of uncontrolled death in the hospital (e.g. cardiac arrest).

What is claimed is:

1. A system for lung preservation comprising:
   a cooler at least partially housing a cooling coil, the cooling coil comprising a proximal end configured to connect to an oxygen source and a distal end configured to connect to endotracheal tubing;
   endotracheal tubing in fluid communication with a conduit extending through the cooling coil;
   a positive end expiratory pressure valve connected to the endotracheal tubing;
   a temperature sensor connected to at least one of the cooling coil and the endotracheal tubing;
   a controller connected to the temperature sensor; and
   a display connected to the controller, wherein the controller is configured to send an alert signal to the display if the temperature reading falls outside of the range between 0 degrees Celsius and 4 degrees Celsius.

2. The system of claim 1, wherein the cooling coil is a copper coil.

3. The system of claim 1, wherein the cooler has an interior surface having a circular profile, and a portion of the cooling coil is configured to wrap along the interior surface of the cooler.

4. The system of claim 1, wherein at least one of the proximal end of the cooling coil and the distal end of the cooling coil is configured as an open copper conduit.

5. The system of claim 1 further comprising:
   an oxygen source configured to provide continuous oxygen flow connected to the proximal end of the cooling coil.

6. The system of claim 5, wherein the oxygen source is an oxygen concentrator connected to the cooler.

7. The system of claim 1 further comprising:
   a coil spacer having a first and second opening configured to secure and maintain space between adjacent coils.

8. A method for preserving a lung comprising:
   placing a lung within a cooler housing comprising a cooling coil at least partially disposed within the housing; and
   supplying a continuous flow of cooled oxygen to airways within the lung via the cooling coil while maintaining a positive end expiratory pressure, wherein the cooled oxygen is maintained at a temperature between 0 degrees Celsius and 4 degrees Celsius.

9. A method for preserving a lung for transportation comprising:
   placing a lung within a cooler housing;
   supplying a continuous flow of cooled oxygen to airways within the lung while maintaining a positive end expiratory pressure; and
   transporting the housing while supplying the continuous flow of cooled oxygen to airways within the lung, wherein the cooled oxygen is maintained at a temperature between 0 degrees Celsius and 4 degrees Celsius.

* * * * *